United States Patent [19]

Binford

[11] Patent Number: 4,947,811
[45] Date of Patent: Aug. 14, 1990

[54] FLOATING VALVE STEM SEAL

[75] Inventor: J. Dudley Binford, Richmond, Ind.

[73] Assignee: Dana Corporation, Toledo, Ohio

[21] Appl. No.: 373,421

[22] Filed: Jun. 30, 1989

[51] Int. Cl.$^5$ .................................................. F01C 3/08
[52] U.S. Cl. ................................ 123/188 P; 277/153; 277/174; 277/177; 277/178
[58] Field of Search ................ 277/152, 153, 178, 187, 277/38, 39, 173-175; 123/188 P, 188 GC

[56] References Cited

U.S. PATENT DOCUMENTS

| | | | |
|---|---|---|---|
| 2,157,867 | 5/1939 | Robertson et al. .- | |
| 3,069,174 | 12/1962 | Skinner | 277/175 |
| 3,235,271 | 2/1966 | Johnson et al. | 277/152 |
| 3,372,941 | 3/1968 | Liebig | 277/178 |
| 3,379,445 | 4/1968 | Fisher . | |
| 3,459,166 | 8/1969 | Updike et al. | 277/178 |
| 3,498,621 | 3/1970 | Wilson . | |
| 3,498,622 | 3/1970 | Belart . | |
| 3,531,134 | 9/1970 | Kammeraad . | |
| 3,554,180 | 1/1971 | Lesser . | |
| 3,599,992 | 8/1971 | Kammeraad . | |
| 3,699,942 | 11/1972 | Moray . | |
| 3,771,800 | 11/1973 | Wilson et al. . | |
| 4,474,379 | 10/1984 | Hölzer | 277/178 |
| 4,494,759 | 1/1982 | Kieffer | 277/178 |
| 4,502,696 | 3/1985 | Kammeraad . | |
| 4,531,483 | 7/1985 | Vossieck et al. | 277/152 |
| 4,773,363 | 9/1988 | Stritzke . | |
| 4,811,704 | 3/1989 | Boehmer et al. | 277/152 |
| 4,811,960 | 3/1989 | Stritzke et al. | 277/153 |
| 4,834,037 | 5/1989 | Lafever | 277/152 |

FOREIGN PATENT DOCUMENTS 2312135 9/1974 Fed. Rep. of Germany ...... 277/174

Primary Examiner—Allan N. Shoap
Assistant Examiner—Daniel G. DePumpo
Attorney, Agent, or Firm—F. B. McDonald

[57] ABSTRACT

A valve stem seal assembly includes a rigid cylindrical shell and an annular resilient seal body supported within an endwall of the shell. The resilient seal body includes an exterior circumferential groove, and the endwall contains an aperture adapted for being received in the groove. The circumference of the aperture in the endwall is greater than the circumference of the bottom of the groove. A predetermined radial clearance is thereby created to provide that the resilient seal body remains concentric with a reciprocating valve stem, notwithstanding the fact that the stem may be eccentric relative to a valve guide to which the assembly is affixed.

8 Claims, 1 Drawing Sheet

FLOATING VALVE STEM SEAL

BACKGROUND OF THE INVENTION

This invention relates to valve stem seals utilized in intake and exhaust manifolds of internal combustion engines. More particularly, this invention relates to concentricity of valve stem sealing elements about valve stems.

Valve stem seals of the type including resilient seal bodies supported within rigid cylindrical casings or shells are available in many designs and configurations. Most designs address the efficiency of the actual sealing lip portions of such seals, primarily as related to the "metering" of oil flow between the interface of the lip and the stem.

Generally the rigid cylindrical shell is fixedly supported on a valve stem guide, with the inside diameter of the shell frictionally engaging the outside diameter of the guide. Although the shell supports a sealing element adapted to be centered about the valve stem, it will be apparent to those skilled in the art that as a practical matter the valve stem and valve guide are rarely concentrically positioned. Generally, this is not a serious problem where the support portion of the shell and the lip portion of the seal body are relatively far apart. However, as the latter spacing becomes smaller, there is less flexibility in the body of the seal to accommodate radial offset between stem and guide. When eccentricity is extreme, resultant distortion of the seal body can cause non-uniform pressures on the sealing element, which in turn produces undesirable wear patterns and unpredictable oil control.

SUMMARY OF THE INVENTION

The valve stem seal assembly of the present invention includes an elastomeric seal body supported in a radially extending endwall of a rigid cylindrical shell. For this purpose, the endwall contains a circular opening, and the seal body contains an exterior circumferential groove which accommodates the endwall. A predetermined amount of radial clearance between the opening of the endwall and the bottom of the groove provides a radial float annulus for accommodating stem/guide offset. Thus the circumference of the opening is slightly greater than the circumference of the bottom of the groove, so that distortion of the seal body may be avoided despite the eccentricity between stem and guide.

In one preferred form, the seal body contains a separate valve guide sealing portion adapted to engage the top radial surface of the valve guide. In addition, the stem sealing contact portion of the seal body is a single interior annular lip, while the metallic casing includes a plurality of circumferentially spaced, radially inwardly disposed tangs for gripping the exterior cylindrical surface of the valve guide for retension of the valve stem seal assembly on the guide.

DETAILED DESCRIPTION OF THE PREFERRED EMBODIMENTS

Figure 1:
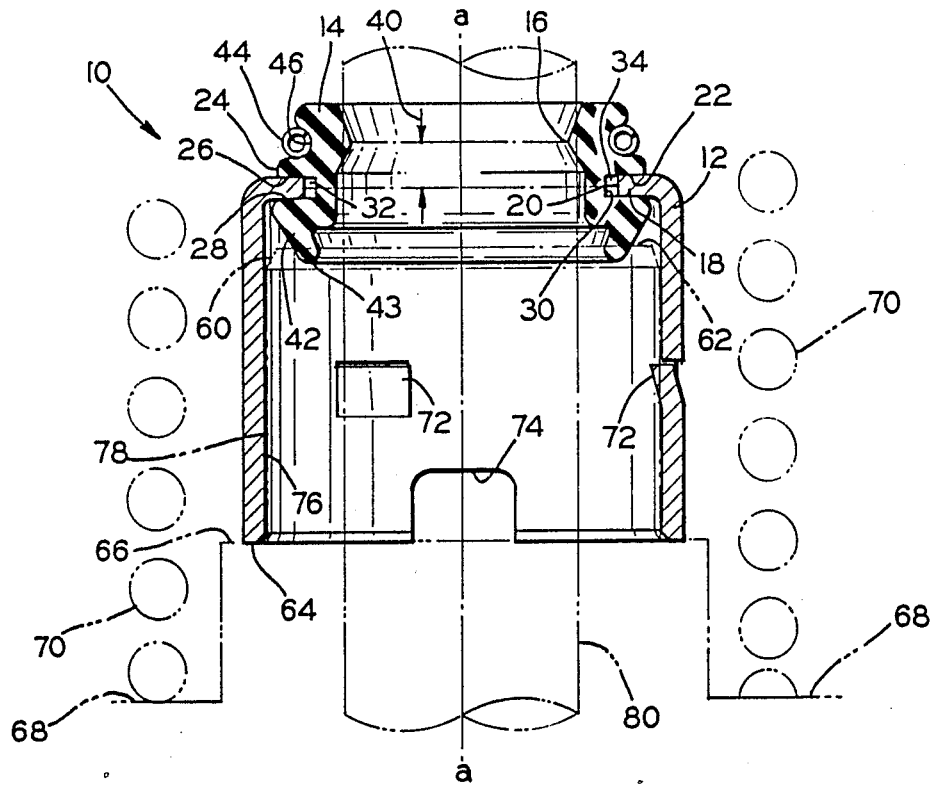
FIG. 1 is a cross-sectional side view of a preferred embodiment of a valve stem seal assembly constructed in accordance with the present invention, shown under an ideal condition of concentricity between valve stem and valve guide.

Referring to the drawings, a valve stem seal assembly 10 includes a rigid metal cylindrical casing or shell 12 having a longitudinal axis "a—a". The assembly 10 includes a resilient seal body 14 preferably formed of an elastomer. The body 14 includes an interior annular lip 16 which sealingly engages a valve stem 80 reciprocal within a valve guide 60.

The cylindrical shell 12 includes a radially extending endwall 18 at the top of the shell, the endwall containing an aperture 20 adapted to support the resilient seal body 14. For this purpose, the exterior 24 of the seal body 14 includes a circumferential groove 22, into which the endwall extends to support the seal body 14.

Those skilled in the art will appreciate that the groove 22 includes a radially extending side wall 26 parallel to and spaced apart from a radial side wall 28 by approximately the thickness of the endwall 18 which must fit into the groove. It will be noted that the bottom 30 of the groove 22 has a circumference smaller than that of the aperture 20 of the endwall 18. This difference provides a radial float annulus 32 by which a lateral or radial clearance 34 is formed for accommodating eccentricity between the valve stem 80 and the valve guide 60.

As suggested earlier, distortion of the seal body is exacerbated as a function of the decrease in the axial distance 40 between the lip 16 and the endwall 20. Thus, for a given amount of stem/guide eccentricity, there is potential for greater inherent distortion as the distance 40 becomes smaller.

Figure 2:
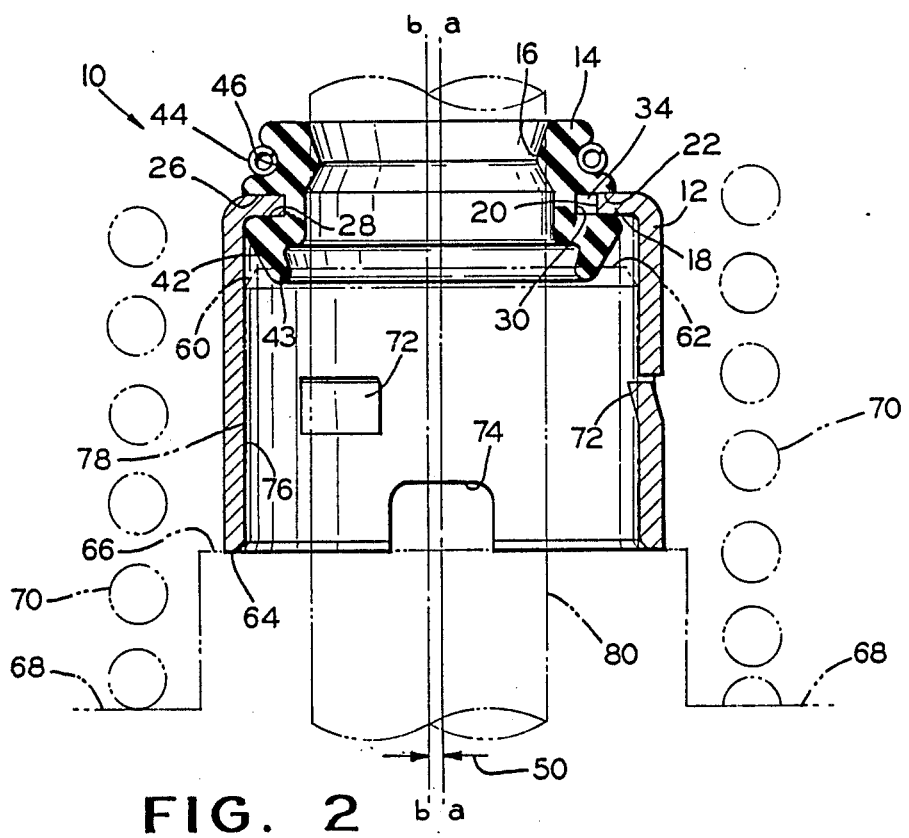
FIG. 2 is a cross-sectional side view of the same preferred embodiment of the valve stem seal assembly constructed in accordance with the present invention, shown with the valve stem and guide being positioned in a condition of maximum eccentricity relative to one another.

Referring specifically now to FIG. 2, the eccentricity is more clearly demonstrated by the radial offset 50 between the longitudinal axis "b—b" of the valve stem 80 and the longitudinal axis "a—a" of the shell 12 and the valve guide 60 to which the shell is fixed. Those skilled in the art will appreciate that geometrically, the radial offset 50 which can be accommodated without seal body distortion will be equal to the amount of lateral or radial clearance 34. Thus the predetermined radial clearance 34 designed into the assembly 10 should be at least equal to the anticipated maximum amount of radial offset 50 between stem and guide. Typically, such clearance would be 20 to 40 thousandths of an inch.

The presently preferred embodiment of the seal body 14 also includes a guide sealing member 42 adapted for engaging the radial top surface 62 of the valve guide 60, and having a frustoconical shape as shown. However, the concept of the radial float of the valve stem seal assembly 10 as herein presented is not limited to the geometry of the guide sealing member, nor that of the stem sealing lip 16. Other sealing designs and configurations may be employed. For example, the single lip 16 may instead be of a multiple lip design. The presently preferred embodiment also includes a spring 44 adapted to be received within a second groove 46. The groove 46, positioned in the exterior 24 of the seal body, is in approximately the same radial plane as the lip 16.

Also in the presently preferred embodiment, the interior wall 76 of the shell 12 is sized to frictionally engage the exterior surface 78 of the guide 60. In addition, a number of perforated tangs 72 circumferentially disposed about the shell are adapted to grip the exterior surface 78 of the guide.

Optimal engagement of the frustonical sealing member 42 will cause the extremity 43 of the guide sealing member 42 to bend radially inwardly. For accommodation of proper contact between the guide sealing member 42 and the top 62 of the guide 60, the shell 12 is sized so that the lower extremity 64 of the shell will contact a first annular step 66, which extends radially about the valve guide 60, upon such optimal engagement.

A valve coil spring 70 is adapted to engage a spring retainer connected to an intake or exhaust valve (neither shown). The opposite end of the spring 70 is supported on a second annular step 68 which also extends radially with respect to the valve guide and is integral therewith. Finally, a removal detent 74 at the extremity 64 of the shell 12 facilitates removal of the assembly 10 from the guide 60 during engine service.

Although only one preferred embodiment has been shown and described herein, the following claims envision numerous additional embodiments which will fall within the spirit and scope thereof.

What is claimed is:

1. In a valve stem seal assembly adapted for securement to a valve guide of an internal combustion engine, said assembly including a rigid shell defining a longitudinal axis and having an endwall containing a first aperture, an annular resilient seal body disposed within said shell, said body having a second aperture defining an interior annular lip adapted to provide continuous sealing engagement with an axially reciprocating valve stem, said seal body further having an exterior circumferential groove, said groove defining a pair of parallel, radially extending side walls, said groove further defining a bottom, wherein said seal body is supported in said first aperture by said circumferential groove; an improvement comprising a radial float annulus defined by a predetermined amount of radial clearance between said first aperture and said bottom of said groove, wherein the circumference of said first aperture is greater than the circumference of said bottom of said groove, wherein said predetermined radial clearance is adapted to accommodate a specified amount of radial offset between said reciprocating valve stem and said valve guide to avoid distoration of said seal body, and wherein said seal body further comprises a guide sealing member extending generally longitudinally of said body, said member being axially spaced from said endwall and adapted to sealingly engage a radial top surface of said valve guide.

2. The valve stem seal assembly of claim 1 wherein said second aperture defines a single annular lip.

3. The valve stem seal assembly of claim 1 wherein said second aperture defines a multiple lip surface.

4. The valve stem seal assembly of claim 1 wherein said shell comprises means for securement of said assembly to a valve guide.

5. The valve stem seal assembly of claim 4 wherein said means of securement comprises a circumferential array of radially disposed tangs in said shell.

6. The valve stem seal assembly of claim 5 further comprising a valve guide, wherein said guide comprises an annular step, and said shell comprises an extremity opposite said endwall for contacting said step, thereby limiting insertion of said shell over said valve guide.

7. The valve stem seal assembly of claim 6 wherein said shell further comprises at least one removal detent.

8. The valve stem seal assembly of claim 7 wherein said resilient seal body further comprises a second groove extending circumferentially about said body, and a spring contained within said second groove.

* * * * *